United States Patent
Bolitho (10) Patent No.: US 6,308,441 B1
(45) Date of Patent: *Oct. 30, 2001

(54) EXCAVATOR

(75) Inventor: Jack A. Bolitho, Dennison, OH (US)

(73) Assignee: The Gradall Company, New Philadelphia, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/211,448

(22) Filed: Dec. 15, 1998

(51) Int. Cl.[7] ........................................... E02F 3/64
(52) U.S. Cl. .................................. 37/411; 37/466
(58) Field of Search ............................ 37/DIG. 17, 411, 37/466; 414/718; 74/720, 730.1, 731.1, 732.1, 733.1, 15.86, 15.88

(56) References Cited

U.S. PATENT DOCUMENTS

| | | |
|---|---|---|
| Re. 31,500 | 1/1984 | Brownfield . |
| 2,638,232 | 5/1953 | Perkins . |
| 2,704,131 | 3/1955 | Vahs . |
| 2,708,800 | 5/1955 | Logus . |
| 2,731,097 | 1/1956 | Zeilman et al. . |
| 2,765,041 | 10/1956 | Norrie et al. . |
| 2,783,556 | 3/1957 | Burns et al. . |
| 2,817,911 | 12/1957 | Owen et al. . |
| 2,866,510 | 12/1958 | Flamm . |
| 2,959,260 | 11/1960 | Johnson et al. . |
| 2,979,908 | 4/1961 | Shook . |
| 2,981,012 | 4/1961 | Meyer . |
| 3,300,069 | 1/1967 | Kline . |
| 3,587,886 | 6/1971 | Gano et al. . |
| 3,599,814 | 8/1971 | Brownfield . |
| 3,666,125 | 5/1972 | Gano et al. . |
| 3,854,160 | 12/1974 | Hildebrand et al. . |
| 3,913,697 | 10/1975 | Greene . |
| 3,935,917 | 2/1976 | Eley et al. . |
| 3,949,824 | 4/1976 | Bennett . |

(List continued on next page.)

FOREIGN PATENT DOCUMENTS

| | | |
|---|---|---|
| 29 15 964 | 11/1980 | (DE) . |
| P32 19 971 | 12/1983 | (DE) . |
| 846241 | 8/1960 | (GB) . |
| 337469 | 2/1978 | (SU) . |

*Primary Examiner*—Robert E. Pezzuto
*Assistant Examiner*—Meredith C. Petravick
(74) *Attorney, Agent, or Firm*—Kirkpatrick & Lockhart LLP (57) ABSTRACT

A material handling vehicle is provided which includes a lower truck chassis and an upper material handling structure pivotally supported by the lower chassis, all functions of which vehicle are driven by a single engine. The material handling vehicle is controllable from a main truck cab on the truck chassis or from an upper operator's cab mounted on the upper structure. The single engine provides highway travel power and power to all excavator functions, while the vehicle, including remote travel and implement manipulation capabilities, may be controlled from the upper operator cab. The main engine, when used for over-the-highway travel, powers the driven wheels through a manual transmission in a conventional manner. When at an excavating site and controlled from the upper cab, the engine, through a power takeoff on the front of the transmission connected to the engine, drives a hydraulic pump which supplies hydraulic fluid to power the implement hydraulics and to drive a hydraulic drive motor in response to controls from the upper operator cab. The hydraulic drive motor drives into a secondary power input on a rear portion of the transmission to provide power through the transmission to the driven wheels.

55 Claims, 5 Drawing Sheets

U.S. PATENT DOCUMENTS

| | | |
|---|---|---|
| 4,015,482 | 4/1977 | Ito et al. . |
| 4,023,364 | 5/1977 | Bianchetta . |
| 4,036,508 | 7/1977 | Eddy et al. . |
| 4,162,714 | 7/1979 | Correll . |
| 4,189,021 | 2/1980 | Scheuerpflug et al. . |
| 4,318,451 | 3/1982 | Liggett . |
| 4,467,604 | 8/1984 | Forster . |
| 4,484,655 | 11/1984 | Sheppard, Sr. . |
| 4,516,655 | 5/1985 | Donahue et al. . |
| 4,705,450 | 11/1987 | Gano . |
| 4,725,187 * | 2/1988 | Moelli ................... 414/718 |
| 4,828,452 * | 5/1989 | Bolitho ................... 414/718 |
| 5,226,497 * | 7/1993 | Beaton ................... 180/53.4 |
| 5,957,235 * | 9/1999 | Nishimura et al. ................... 180/306 |
| 6,001,044 * | 12/1999 | Amendt ................... 477/180 |

\* cited by examiner

EXCAVATOR

BACKGROUND OF THE INVENTION

1. Field of the Invention

This invention relates to a material handling vehicle such as an excavator and, more particularly, to a material handling vehicle having a lower truck chassis which includes a truck cab and an upper structure which includes an upper cab and a material handling implement, such vehicle having a single engine on the lower chassis which provides power for operation under the control of an operator in either cab.

2. Description of the Prior Art

Frequently, a heavy-duty material handling vehicle such as a crane or excavator includes a lower or truck chassis on which is horizontally pivotally mounted an upper structure that supports the desired material handling implement. The truck chassis is capable of being driven over the road or highway under the control of an operator in the main truck cab. An upper structure is mounted on the truck chassis by a swing bearing through which a center pin extends for relative movement with respect to the truck chassis. An upper structure operator's cab is provided on the upper structure to move with a material handling boom and implement. During operation at a construction site, an operator in the upper structure operator cab can control movement of the truck chassis and also the material handling mechanism.

Previously, in order to provide for remote operation from the upper structure cab of both the manipulations of the material handling mechanism as well as the movement of the entire vehicle, two separate engines were required. One engine was mounted on the truck chassis and controls the highway operation of the vehicle. A separate engine was mounted on the upper structure and provided motive power both to the material handling mechanism as well as powering, through a hydraulic pump and motor, the motion of the truck chassis. U.S. Pat. No. 3,599,814 teaches a remote drive mechanism for powering the drive wheels from an auxiliary engine mounted on the upper structure. U.S. Pat. No. 4,318,451 also teaches a material handling vehicle having a power supply on the upper structure which through a hydraulic motor drives the vehicle at the job site.

As is well known in the art, the previously unavoidable requirement of two separate engines, one on the truck chassis and one on the upper structure, was fraught with a host of disadvantages. For example, with the prior art construction requiring two separate engines the additional weight and cost of the auxiliary engine itself as well as duplicate fuel tanks, radiators, battery and charging systems, air compressors and dryers, power steering pumps, air cleaners and exhaust systems, controls, shroudings and mountings, noise barriers, engine gauges, etc. are incurred. In addition, duplicate maintenance functions are involved in a two-engine vehicle and operating costs are necessarily increased.

In an effort to overcome the problems associated with two engine excavators, the single engine excavator disclosed in U.S. Pat. No. 4,705,450 was developed. That patent discloses a drive train for an excavator having an engine mounted on a lower chassis which is coupled to an automatic powershift transmission. The disclosures of U.S. Pat. No. 4,705,450 are hereby incorporated herein by reference.

Despite the many advantages of the excavator disclosed in U.S. Pat. No. 4,705,405, there are features associated with the powershift transmission which could withstand improvement. For example, the powershift transmission and its required support system is relatively complicated and costly. As such, initial, maintenance, and repair/replacement costs for powershift transmissions are increased. Also, such transmissions consume energy which translates into lower excavator highway transport speeds and increased fuel usage.

The subject invention is directed toward an improved material handling apparatus which overcomes, among others, the above-discussed problems with material handling vehicles and which is effective to sufficiently power all customary remotely controlled functions of a material handling apparatus while requiring only one engine driving into a manual transmission.

SUMMARY OF THE INVENTION

In accordance with the present invention, there is provided an improved material handling vehicle which includes a lower chassis having a truck cab and a relatively movable upper structure pivotally mounted on the lower chassis and having an operator's cab thereon. However, the present apparatus requires only a single, lower chassis mounted engine for powering both movement of the vehicle to the job site under the control of an operator in the truck cab and for both material handling implement operation and vehicle movement around the job site controlled by an operator situated in the upper cab. When driving to the job site, the engine powers the lower chassis drive wheels through a manual transmission in a conventional manner. When remote chassis or material handling implement operation are to be directed from the upper cab, the engine, through a power takeoff on the front countershaft of the transmission, drives a hydraulic pump. The engine does not then directly deliver power to the driven chassis wheels in a conventional manner. The pressurized hydraulic fluid from the hydraulic pump is fed through a propel control valve to a remote drive hydraulic motor which produces rotational force that is driven into the transmission through a second power input thereto. The transmission, through the second power input, drives the driven wheels of the vehicle. Direction of movement is selected by driving the hydraulic motor in the desired direction while two remotely controlled transmission gear ranges are available. In addition, the hydraulic pump provides pressurized hydraulic fluid through control valves to power the various manipulations of the material handling system.

The single engine thus supplies both conventional overthe-road power for the truck chassis and also power for the hydraulic pump and, hence, to the remote drive motor for onsite remote drive or to power the various implement operations. The drive arrangement allows either rear wheel drive or four-wheel drive of the carrier. For a rear wheel drive configuration, the engine directly drives the manual transmission directly connected, by means of a drive shaft, to a rear drive axle and, hence, the rear wheels. In a four-wheel drive configuration, the drive shaft drives a specific rear differential which drives the rear drive axle and its rear wheels by means of a rear drive shaft. The rear differential has a powershaft which drives another drive shaft coupled to a front drive axle and the front wheels.

To operate the material handling apparatus, the engine must not be running when shifting into the remote operating mode from the truck cab. Shifting to remote operation engages the hydraulic pump through an air shift cylinder in operative connection with the front power takeoff on the transmission. The engine is then started from the upper cab and the operator can operate the unit from the upper cab as he would a standard telescoping boom hydraulic material handler, such as an excavator. Control of the engine speed from the upper structure is accomplished through a remote throttle and an engine monitor.

The hydraulic pump pumps hydraulic fluid through a propel control valve, which directs the fluid either through the center pin to the upper structure implements or to the hydraulic motors and then through the center pin to the upper structure hydraulic reservoir. On the upper structure, the supply of pressurized hydraulic fluid is directed by control valves to power the implement hydraulic circuits independently and/or simultaneously. If the operator engages the remote travel control, the flow to the upper structure is reduced but operation and continuance of all implement motions is still possible.

Accordingly, the present invention provides solutions to the aforementioned problems relating to a dual-engined material handling vehicle. As the single engine arrangement provided is sufficient to both routinely drive the truck chassis and to provide for remotely controlled travel and material handling implement control, the shortcomings of prior art material handling vehicles are overcome. In addition, the overall apparatus engineering, manufacture, operation and maintenance costs are significantly reduced.

These and other details, objects and advantages of the invention will become apparent as the following description of the present preferred embodiment thereof proceeds.

BRIEF DESCRIPTION OF THE DRAWINGS

For a better understanding of the invention reference may be had to the preferred embodiment exemplary of the invention shown in the accompanying drawings in which.

DETAILED DESCRIPTION OF THE PREFERRED EMBODIMENTS

Referring now to the drawings wherein the showings are for purposes of illustrating the present preferred embodiment of the invention only and not for purposes of limiting same, the figures show a mobile material handling vehicle 10 which, for purposes of the present DETAILED DESCRIPTION OF THE PREFERRED EMBODIMENTS, will be described as an extensible or telescoping boom hydraulic excavating apparatus, also called an excavator. It is to be understood that various other forms of material handling apparatuses are also contemplated herein as being within the scope of the present invention.

Figure 1:
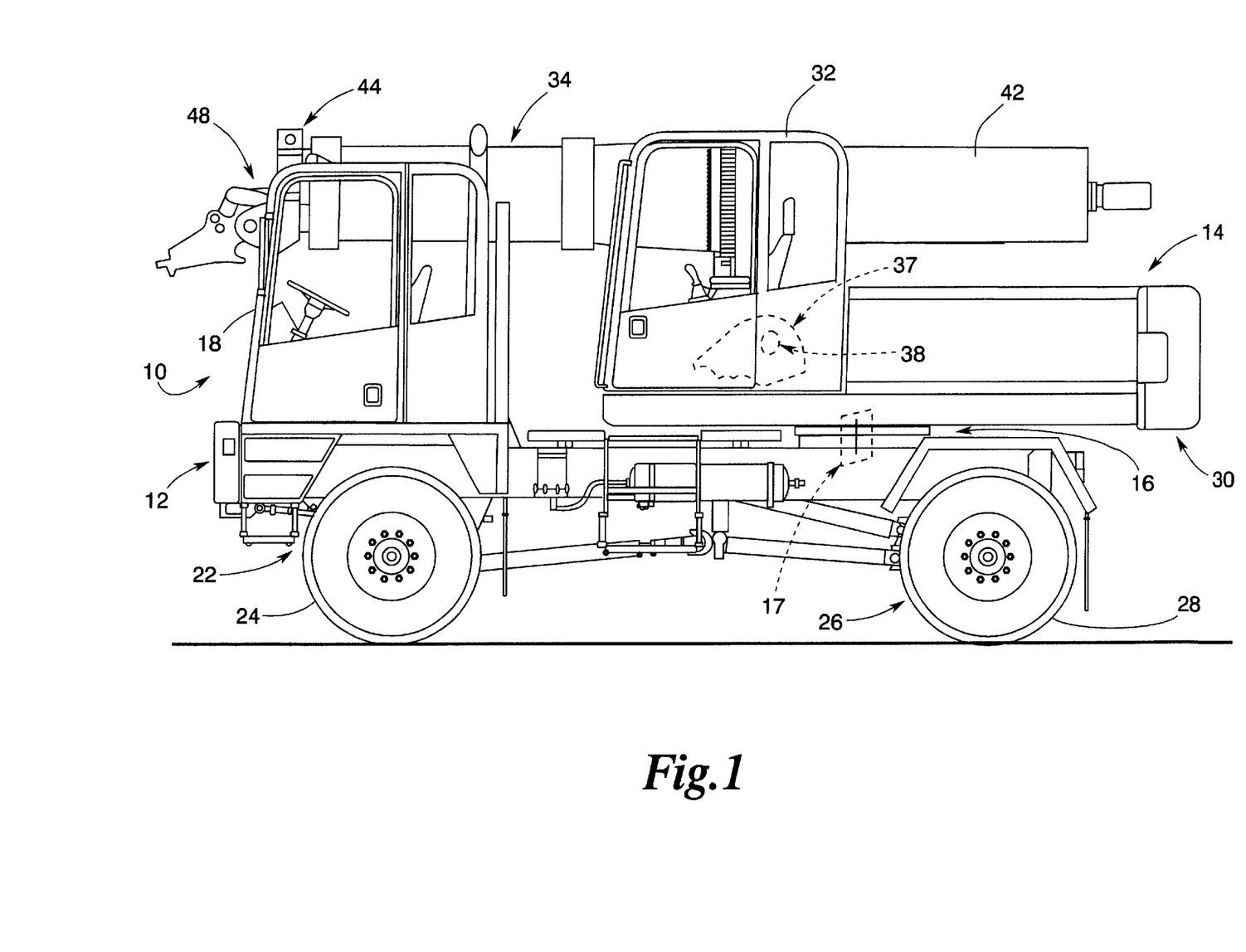
FIG. 1 is a left side view of a truck-mounted telescoping boom hydraulic excavator constructed according to the teachings of the present invention.
Figure 2:
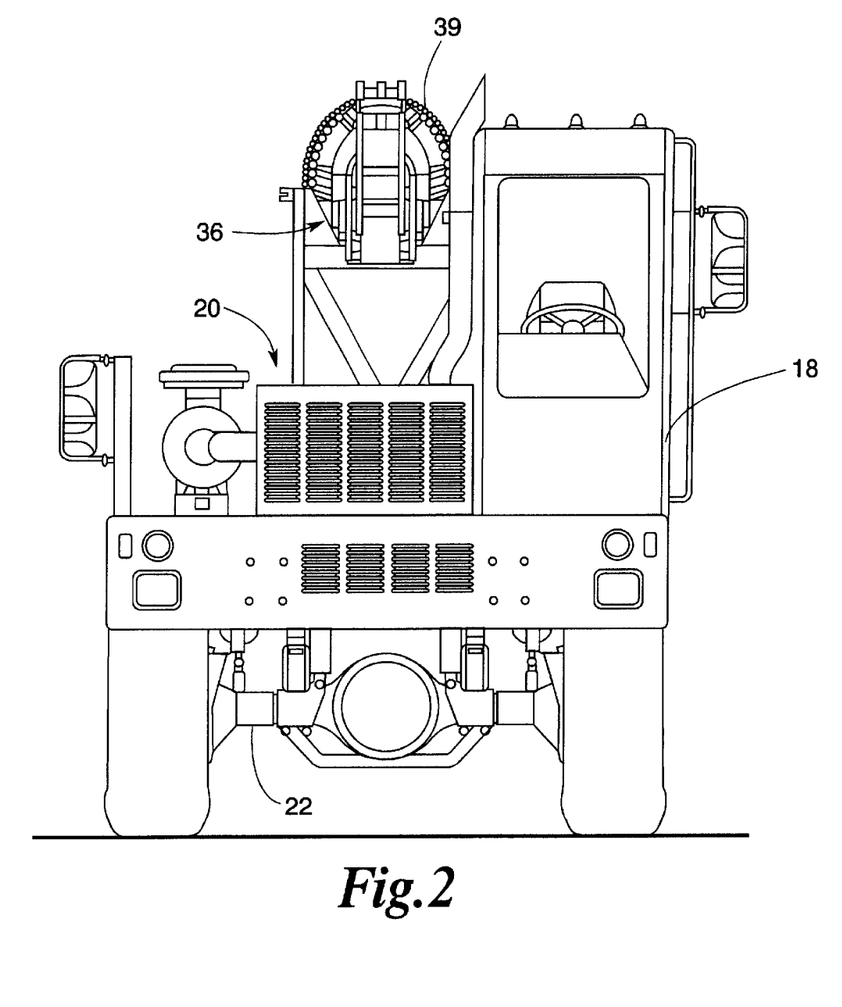
FIG. 2 is a front view of the hydraulic excavator.

More particularly and with reference to FIG. 1, there is shown an excavator 10 which includes a lower truck chassis 12 and an upper structure 14 rotatably supported thereon by means of a swing bearing 16 through which passes a center pin 17 such that the upper structure is rotatable with respect to the lower chassis by means of a hydraulic swing motor. Lower chassis 12 is provided with a truck cab 18 mounted beside an engine 20 with conventional engine controls passing therebetween. A front axle 22 supports the end of lower chassis 12 nearest truck cab 18 on front wheels 24 while a rear axle 26 supports the rear of lower chassis 12 on rear wheels 28. It should be noted that for excavators 10 of varying sizes, one, two or more rear axles 26 may be provided.

The upper structure 14 includes a platform, generally indicated as 30 on one end of which is mounted a remote upper structure operator's cab 32. In addition, an extensible boom means, generally 34, is mounted to a boom support cradle 36 which is pivotally attached to an upstanding support member 37 of upper platform 30 by means of pins, generally shown as 38, which construction allows boom 34 to be vertically pivotable with respect to upper platform 30. Such vertical pivoting of boom 34 is accomplished by means of a hydraulic hoist cylinder pivotally attached between boom cradle 36 and the end of upper platform 30 remote from operator cab 32. One end of the boom 34 is provided with a circumferential gear 39 which meshes with a gear reduction unit supported by a bearing on the support 37. As such, boom 34 may be rotated about an axis parallel to its axis.

Boom 34 includes a first section 42 which is mounted to support 37 and a second section 44 which is provided to be supportable by and hydraulically retractable within first section 42 by a hydraulic means known to those in the art. A material handling implement, such as a bucket, may be preferably movably attached to the free end of second boom section 44 by means of a pivotable support 48 which is preferably pivotable by means of a hydraulic cylinder.

With respect to the general operation of excavator 10, truck cab 18 is occupied by an operator during over the road or distant movement of the excavator 10 to a selected job site. Operator cab 32 is occupied by the operator for control of excavator 10 around a given job site and when it is desired to manipulate boom 34, a work implement such as a bucket, or to rotate upper structure 14 relative to truck chassis 12 in a manner known in the art. The movement of lower chassis 12 can be provided by either a two wheel drive system in which only rear wheels 28 are preferably driven or a four-wheel drive system in which all wheels 24 and 28 are driven. General operating characteristics and functional capabilities of a material handling apparatus 10 are similar to those disclosed in U.S. Pat. Nos. 3,587,886, 3,599,814 and 3,666,125 and 4,705,450.

Figure 3:
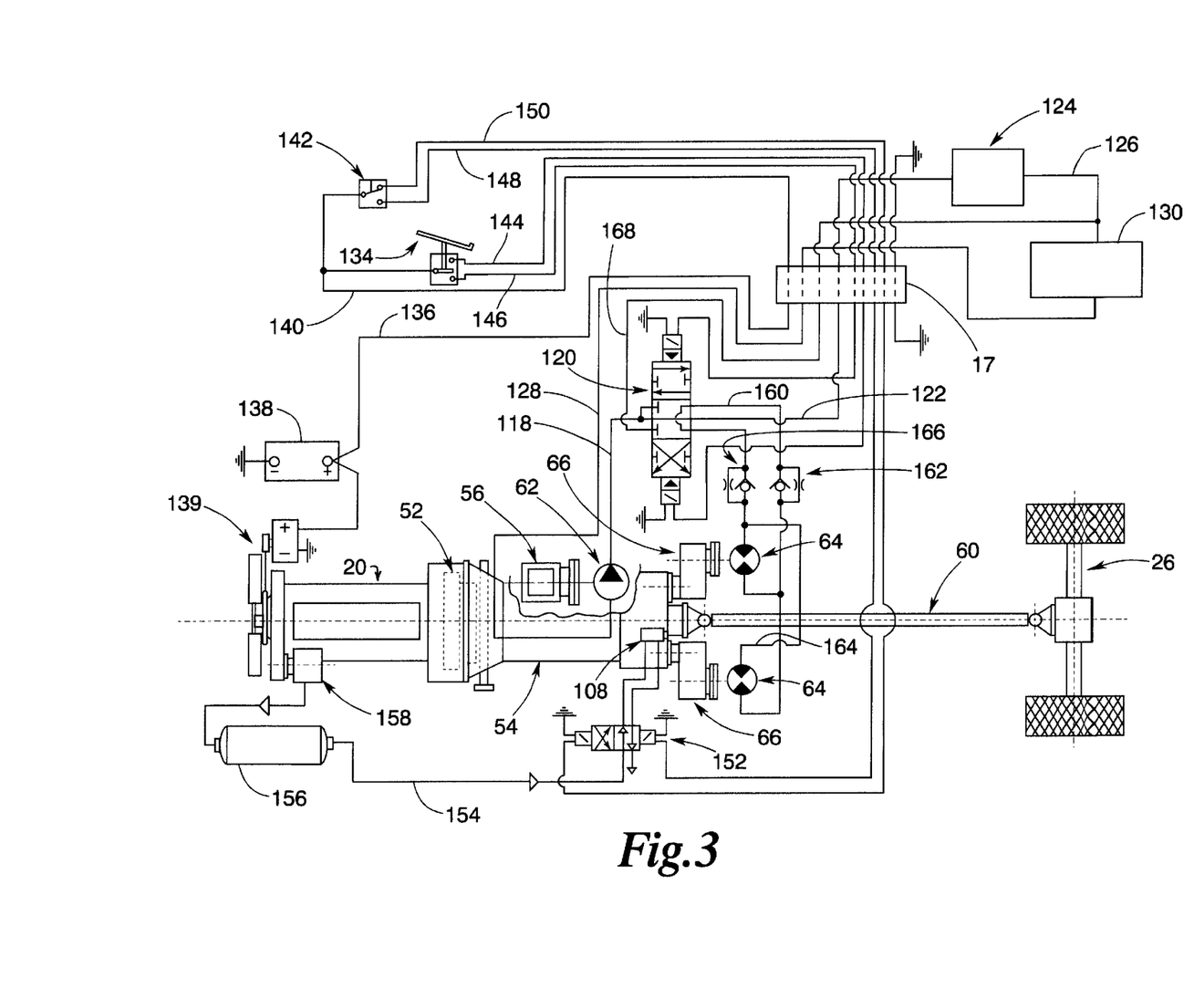
FIG. 3 is a hydraulic schematic showing portions of the hydraulic circuit for remote control of the single engine excavator shown in FIG. 1.
Figure 4:
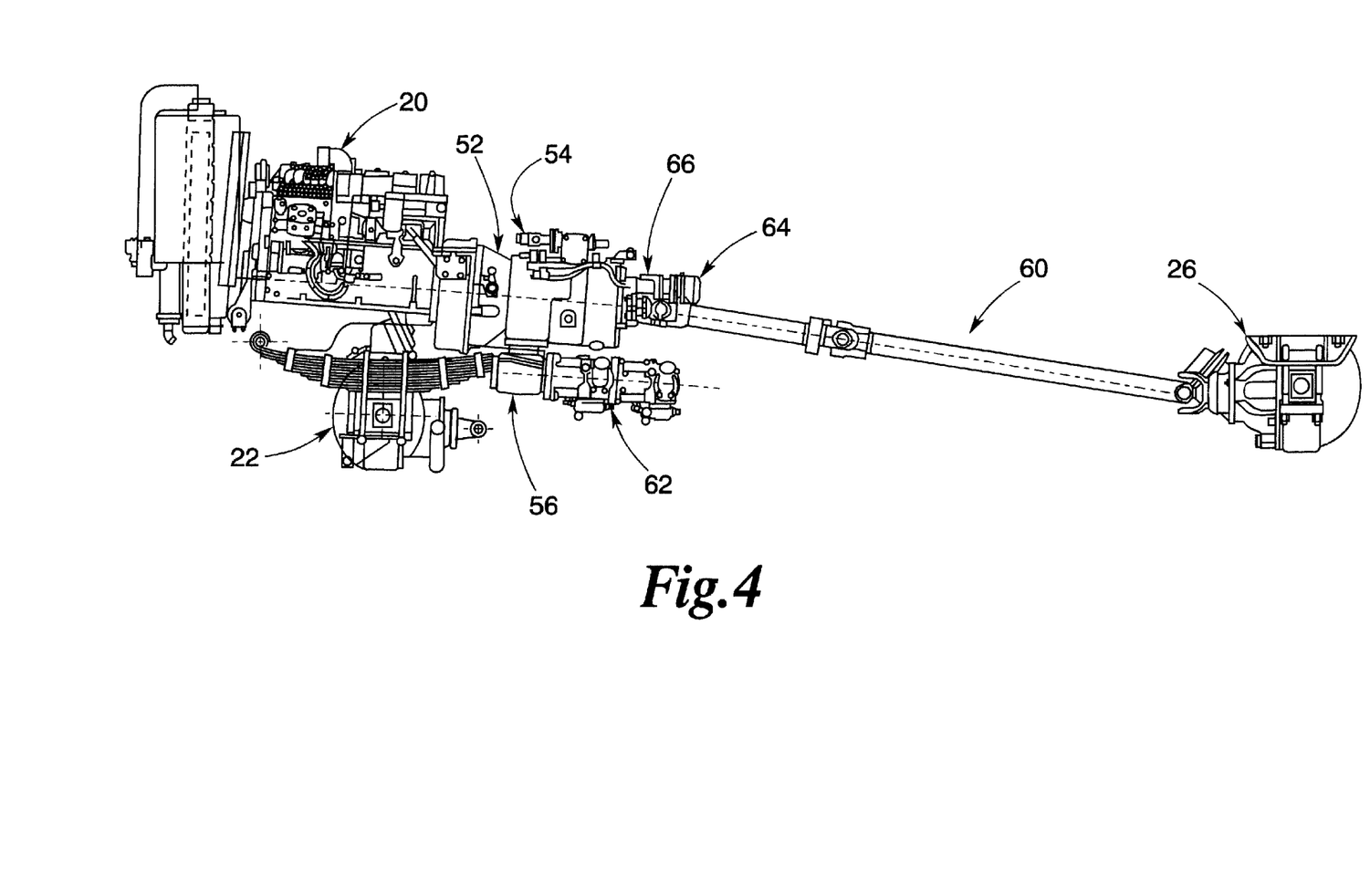
FIG. 4 is a simplified view of the engine and transmission used in the disclosed hydraulic excavator.
Figure 5:
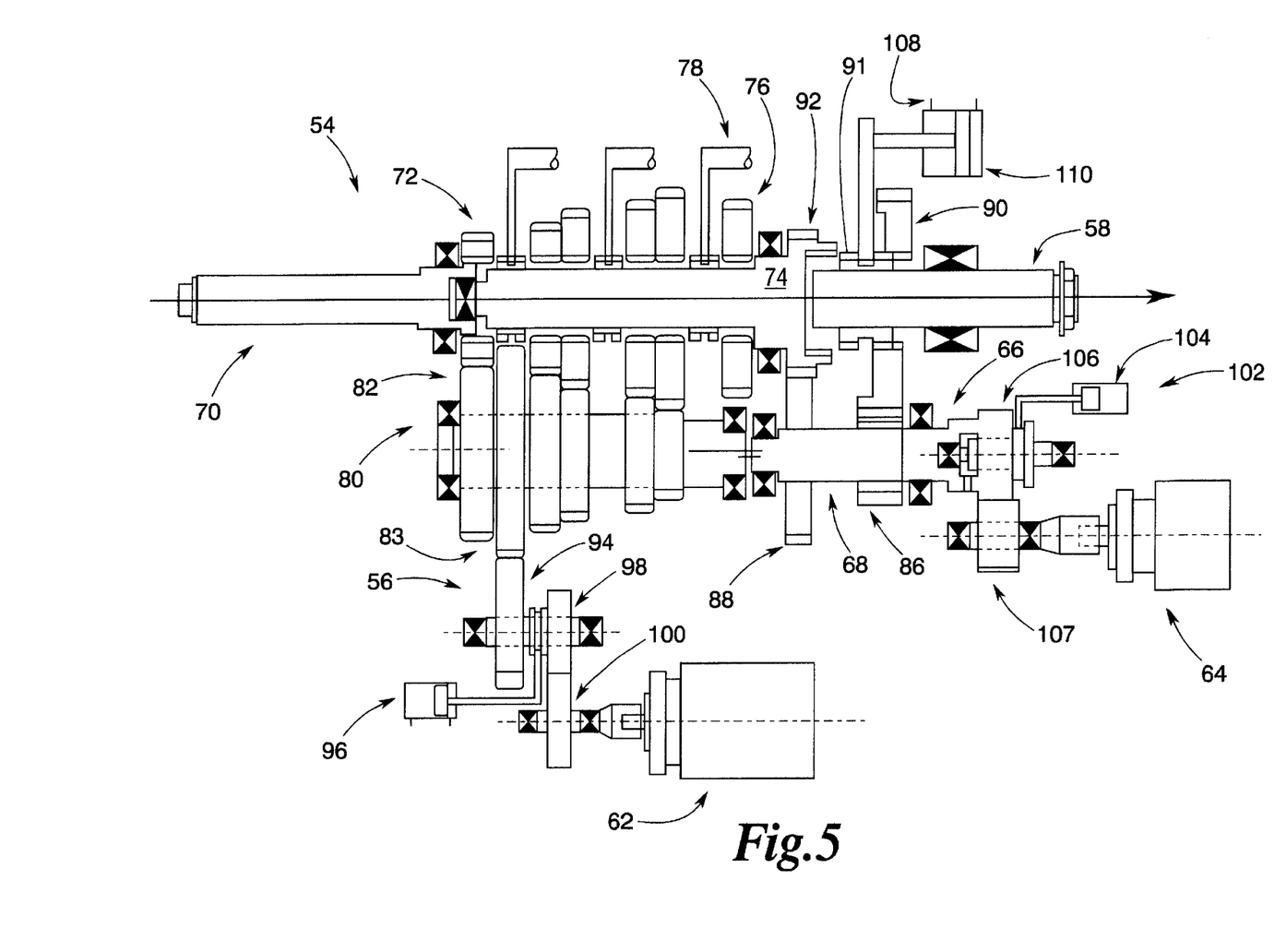
FIG. 5 is a side schematic view of the transmission and associated components of the hydraulic excavator of the present invention.

Referring now to FIG. 3, there is shown a hydraulic schematic and outlined representations of related components for controlling the movement of material handling apparatus over the road by an operator in the truck cab 18 or for remote control at a job site by an operator in the upper cab 32 of the material handling implement or of remote travel of excavator 10. FIG. 4 is provided to illustrate the position of various of the components of excavator 10 described in connection with FIG. 3, while FIG. 5 illustrates the power transmitting components of excavator 10.

An engine 20 provides power for both over the road and for the remotely controlled, job site operation of excavator 10. The engine 20 is provided on the front portion of lower chassis 12 and may comprise a suitable source of power for excavator 10 such as a Cummins Engine 6BT 5.9 turbo charged diesel, liquid-cooled, 4-cycle inline 6-cylinder engine. A manual transmission 54 including clutch 52 is provided adjacent engine 20 to accept the rotational output thereof. Transmission 54 provides two alternative rotational outputs; one output drives through the gears of transmission 54, while the other provides power to a forward power takeoff 56. Transmission may preferably comprise a 9 speed manual transmission with 9 speeds forward, 2 reverse and neutral, such as that manufactured by Eaton Fuller and designated as Models RTX 11609B or RTX 14609B. Forward motion, reverse motion and the gear range employed may be selected through the use of various gear combinations mounted within transmission 54. Transmission 54 preferably has a rearwardfacing power output shaft 58 which, through driveshaft connection 60 can drive a rear axle 26 and, hence, the rear wheels 28.

In the operation of the power transmitting components of the excavator 10, the engine 20 through the clutch 52 provides rotational power to the manual transmission 54. In normal over-the-road operation, the power from engine 20 passes through the gears of transmission 54 in customary fashion to the output shaft 58. In the remote operation of the present invention, the power provided to transmission 54 is directed through the forward power takeoff 56 to power a hydraulic pump 62. Pressurized fluid from hydraulic pump 62 is provided to dual hydraulic motors 64, which may be coupled to the rear countershaft power takeoffs 66 on transmission 54. The rear countershaft power takeoffs 66 are coupled to the twin rear countershafts 68. The rear countershafts 68 may be coupled through appropriate gears to the output shaft 58.

The transmission 54 includes an input shaft 70 which is connected to the clutch 52. The input shaft 70 includes a gear 72 which always rotates therewith. Coaxially with, but only selectively coupled to input shaft 70, is main shaft 74. Main shaft 74 is also coaxial with output shaft 58, but is not typically directly coupled thereto. Transmission 54 also includes a series of gears generally shown as 76, which may be moved by transmission shift forks generally shown as 78. The transmission 54 also includes a front countershaft, generally shown as 80, which rotates with input shaft 70 due to the fact that a gear 82 splined to front countershaft 80 is in constant engagement with gear 72. A pair of rear countershafts 68 are also provided within transmission 54. The rear countershafts include gears 86 and 88 thereon, which may be caused to mesh with gears 90 and 92 respectively, and may be coupled to output shaft 58 by movable splined gear 91. Gear 90 is supported coaxially around shaft 58 while gear 92 is formed as part of shaft 74. A gear 83 is provided on the front countershaft 80 which is coupled to a gear 94 in the front power takeoff 56. The front power takeoff 56 includes an air shift apparatus 96. Air shift 96 is coupled to a gear 98 which is, in turn, coupled to a gear 100 which is coupled to the hydraulic pump 62.

A pair of hydraulic motors 64 are provided such that one is coupled to each rear countershaft 68 by means of air shifts 102. Air shifts 102 each include a displaceable piston 104 which is coupled to a gear 106 which is engagement with a gear 107 coupled to the corresponding hydraulic motor 64. Gears 106 are also coupled to the rear countershafts 68. It is additionally notably that a further air shift 108 is provided with a displaceable piston 110, which controls whether gear 90 on output shaft 58 engages gear 86 on rear countershafts 68 or whether 92 engages gear 88 on rear countershafts 68. It is by virtue of this election of such gears that the travel speed of excavator 10 may be controlled while under remote operating mode by an operator in the upper cab 32.

When at the job site, if operation of the material handling implement or remote travel is desired to be controlled from upper operator's cab 32, the engine 20 drives through the front power takeoff 56 to power hydraulic pump 62. Hydraulic fluid from pump 62 is provided via line 118 to an electrically actuated remote propel control valve 120. Hydraulic fluid from control valve 120 may be provided through line 122 through the center pin 16 to the upper structure 14. The hydraulic fluid from line 122 then passes to a series of hydraulic control valves generally shown as 124. Control valves 124 are connected to a reservoir 13 by line 126. The hydraulic control valves 124 are coupled to the various hydraulic functions which are under the control of an operator in upper cab 32, namely the boom 34 hoist circuit, the boom 34 extension circuit, the swing of upper structure 14 relative to truck chassis 12, the implement operating function and the tilting of boom 34 and travel actuator control (described hereinbelow), as well as other excavator 10 controls and remote power steering controls.

The remote propel control valve 120 is electrically actuated by means of a remote travel control switch 134 on upper structure 14. Specifically, the remote travel control switch 134 is connected to a wire 136 which is connected to the battery 138 (which is connected to an alternator 139 powered by engine 20). Line 136 effectively passes through the center pin 17 and continues as wire 140 which powers the remote travel control switch 134. Wire 140 is also connected to the remote transmission shift switch 142. The remote travel control switch 134 is connected by means of wires 144 and 146 effectively through center pin 17 to the remote propel control valve 120 to control the position thereof. The remote transmission shift switch 142 is effectively coupled to through wires 148 and 150 through center pin 17 to the air shift control valve 152. The air shift control valve 152 is also pneumatically connected via line 154 to an air tank 156 which, in turn, is coupled to an air compressor 158. As such, the electric signals from the remote transmission shift switch 142 control the position of the air shift control valve 152 which, in turn, controls the position of air shift 108 to thereby elect either gear 90 or 92 to be in connection with the rear countershaft 84 and has determined the gear ratio provided to output shaft 58.

As stated above, the remote travel control switch 134 electrically determines the position of the remote propel control valve 120. When the remote propel control valve is moved from the center position, for example into the uppermost position of the valve shown in FIG. 3, hydraulic fluid is provided from reservoir 130 through line 128 and into pump 62. Fluid then passes from pump 62 to line 118 and through remote propel control valve 120 to line 160 which is coupled through a flow-restricting check valve 162 to one side of the hydraulic motors 64 to rotate them in what will be termed the forward direction. Hydraulic fluid returning from motors 64 passes through line 164 and flow-restricting check valve 166 back through the remote propel control valve 120 and into line 168. Hydraulic line 168 then passes through hydraulic connection in center pin 17 to the hydraulic control valves 124 to control various upper structure functions. It will be appreciated that when remote propel control valve 120 is moved to the position shown lowermost in FIG. 3 hydraulic fluid passes to the hydraulic motors 64 to rotate them in the opposite direction. Hydraulic fluid then passes from the hydraulic motors 64 back through the remote propel control valve 120 and to the hydraulic control valves 124 on the upper structure 14.

To operate excavator 10, the engine 20 on lower chassis 12 is shut off and the transmission is shifted into neutral when shifting into remote operation from the truck cab 18. By selecting the remote mode of operation of excavator 10, the remote travel control switch 134 and the remote transmission shift switch 142 are energized. Furthermore, the air shift 96 is engaged to cause the hydraulic pump 62 to be coupled to the front power takeoff 56. Furthermore, the air shifts 104 are energized to couple the hydraulic motors 64 to the rear power takeoffs 66. In this mode of operation, rotational power provided by input shaft 70 drives gear 72 which, in turn, drives gear 82 on front countershaft 80. This causes the rotation of gear 83 which, in turn, powers gear 94. Because the air shift 96 has been engaged, gear 98 is then rotated which, in turn, rotates gear 100 to power hydraulic pump 62. Hydraulic fluid from hydraulic pump 62 passes through the propel control valve 120 under the operator's control and into the hydraulic motors 64. The hydraulic motors 64 are coupled to gear 107 and then to gear 106 in the air shift rear power takeoff 102. Gear 106 causes the rotation of rear countershafts 68 which, in turn, rotate both gears 88 and 86. As indicated above, the operator in the upper cab 32 may select via remote transmission shift switch 142 whether gear 92 is coupled to gear 88 or whether gear 90 is coupled to gear 86. In either event, output shaft 58 is rotated which in turn powers the drive shaft 60 to the rear axle 26. In four-wheel drive mode the rear axle is coupled to the forward extending drive shafts to also rotate the front axle 22. Also, the output shaft 58 may serve 2 or more rear axles 26 in excavators 10 of differing sizes.

The disclosed construction of hydraulic excavator 10 lowers the machine center of gravity and improves machine stability compared to current excavators because by the use of a single engine 20, the auxiliary engine and related accessories, drives and pumps, reservoirs etc. are removed from the rotating upper structure 30 and located on the lower chassis 12. The upper counterweight to which the engine contributed is replaced by a much lower profile counterweight. Machine weight and cost are reduced significantly because only one of each of the following is required with the disclosed single engine machine; fuel tank, radiator, battery and charging system, air compressor and air dryer, power steering pump, air cleaner and exhaust system, clutch, engine, shrouding and mounting, noise barriers, engine gauges as well as reduced instrumentation and controls. Control of the carrier engine speed from the upper cab can be accomplished through an electronic or air actuated throttle.

It will be understood that various changes in the details, materials and arrangements of parts which have been herein described and illustrated in order to explain the nature of the invention, may be made by those skilled in the art within the principle and scope of the invention as expressed in the appended claims.

What is claimed is:

1. A material handling vehicle capable of over-the-road travel to and from a job site comprising:
    a. a lower truck chassis supported by a plurality of wheels, at least two of which are drive wheels, said lower truck chassis having a first operator's station;
    b. an upper structure mounted on said lower chassis and having a second operator's station;
    c. a manipulatable material handling implement mounted on said upper structure;
    d. an engine mounted on said lower chassis, said engine being controllable from said first operator's station;
    e. hydraulic power means, said hydraulic power means being controllable from said second operator's station, said hydraulic power means comprising:
        (i) a hydraulic drive means; and
        (ii) implement control means coupled to said material handling implement for manipulating said material handling implement; and
    f. a manual transmission mounted on said lower chassis, said transmission having a main drive gear coupled to said engine, a selectable output means drivedly coupled to said main drive gear and coupled to said hydraulic drive means, a secondary input means coupled to said hydraulic drive means and an output drive means coupled to said drive wheels, so that said engine and said main drive gear or said selectable output means, said hydraulic drive means and said secondary input means may drive through the gears of said transmission to drive said output drive means and said drive wheels.

2. Apparatus of claim 1 in which said hydraulic drive means comprises:
    a. a hydraulic pump selectively coupled to said selectable output means; and
    b. at least one hydraulic drive motor in fluid communication with said hydraulic pump and selectively coupled to said secondary input means.

3. Apparatus of claim 2 further comprising a propel control valve in fluid communication between said hydraulic pump and said at least one hydraulic drive motor, said propel control valve further comprising means for either allowing hydraulic fluid flow from said pump to said at least one hydraulic drive motor or for prohibiting such flow.

4. Apparatus of claim 3 in which said at least one hydraulic drive motor may provide a rotational output in a forward direction or in a reverse direction.

5. Apparatus of claim 4 in which said propel control valve further comprises means for controlling the direction of rotation of said at least one hydraulic motor.

6. Apparatus of claim 5 in which propel control valve further comprises means for allowing hydraulic fluid to pass from said pump directly to said implement control means or to said at least one hydraulic motor and then to said implement control means.

7. Apparatus of claim 2 wherein said secondary input means comprises two power inputs each coupled to corresponding countershafts in said transmission that may be coupled to said output drive means.

8. Apparatus of claim 2 further comprising controllable coupling means between said secondary input and said output drive means including selectable gear ratios.

9. Apparatus of claim 8 further comprising means for controlling said controllable coupling means from said second operator's station.

10. Apparatus of claim 1 further comprising:
    a. means for horizontally pivotally supporting said upper structure on said lower chassis; and
    b. means for pivoting said upper structure relative to said lower chassis.

11. Apparatus of claim 10 in which said material handling implement comprises:
    a. a boom movably supported at one end thereof on said upper structure; and
    b. a work tool movably supported at the other end of said boom.

12. Apparatus of claim 11 in which said work tool comprises:
    a. a bucket; and
    b. means for pivotally supporting said bucket on said free end of said boom.

13. Apparatus of claim 1 in which said material handling implement comprises:
    a. an extensible boom, said boom having a base boom section and at least one second boom section telescopically received in and supported by said base boom section;

b. boom support means for vertically pivotally supporting said base boom section on said upper structure;

c. means connected intermediate said base boom section and said upper structure for vertically pivoting said base boom section relative to said upper structure;

d. means for extending and retracting said second boom section relative to said base boom section;

e. a work tool connected to the free end of said second boom section; and f. means for pivoting said tool relative to said second boom section.

14. Apparatus of claim 13 further comprising:

a. means for supporting said base boom such that said base boom section is rotatable about its axis; and, b. means for tilting said boom about its axis.

15. Apparatus of claim 14 in which said work tool comprises:

a. a bucket; and b. means for pivotally supporting said bucket on said free end of said second boom section.

16. Apparatus of claim 15 in which said hydraulic power means comprises:

a. a hydraulic drive means selectively coupled to said drive wheels; and b. an implement control means selectively coupled to said material handling implement for manipulating said material handling implement.

17. Apparatus of claim 1 in which said drive wheels comprise all of the wheels in said plurality of wheels.

18. Apparatus of claim 1 further comprising:

a. a front drive axle means attached to the front of said truck chassis;

b. said plurality of wheels comprising front drive wheels rotatably attached to and drivable by said front drive axle means;

c. rear drive axle means attached to the rear of said truck chassis, said rear drive axle means being coupled to said transmission and having a power takeoff;

d. means for coupling said power take off to said front drive axle; and e. said plurality of wheels comprising rear drive wheels rotatably attached to and drivable by said rear drive axle means.

19. Apparatus of claim 18 in which said rear drive axle means comprises a plurality of drive axles having corresponding drive wheels.

20. A material handling vehicle comprising:

a. a drivable main chassis having a main drive cab;

b. an upper structure having a material handling device supported thereon and being rotatably attached to said main chassis and having an upper structure operator cab;

c. a hydraulic pump for providing an output of pressurized hydraulic fluid;

d. a hydraulic motor which when activated provides power for driving a secondary drive means;

e. control means responsive to an operator in the upper structure operator cab for connecting the hydraulic output of said hydraulic pump to said hydraulic motor; and f. a manual transmission mounted on said main chassis and having a main drive gear effective to provide primary output power to drive said main chassis, or secondary output power to said pump, the gears of said transmission being powered by either said engine and said main drive gear or said secondary drive means.

21. Propulsion apparatus for a material handling vehicle capable of over-the-road travel to and from a job site and having a lower truck chassis supported by a plurality of wheels, at least two of which are drive wheels, said lower truck chassis having a first operator's station, an upper structure mounted on said lower chassis and having a second operator's station, a manipulatable material handling implement mounted on said upper structure and an engine mounted on said lower chassis, said engine being controllable from said first operator's station, said propulsion apparatus comprising;

a. hydraulic power means, said hydraulic power means being controllable from said second operator's station, said hydraulic power means comprising:

(i) a hydraulic drive means; and (ii) an implement control means coupled to said material handling implement for manipulating said material handling implement; and b. a manual transmission adapted to be mounted on said lower chassis, said transmission having a main drive gear coupleable to said engine, a selectable output means drivedly coupled to said main drive gear and coupled to said hydraulic drive means, a secondary input means coupled to said hydraulic drive means and an output drive means coupleable to said drive wheels, so that said engine and said main drive gear or said selectable output means, said hydraulic drive means and said secondary input means may drive through the gears of said transmission to drive said output drive means and said drive wheels.

22. Apparatus of claim 21 in which said hydraulic drive means comprises:

a. a hydraulic pump selectively coupled to selectable output means engine; and b. at least one hydraulic drive motor in fluid communication with said hydraulic pump and selectively coupled to said secondary input means.

23. Apparatus of claim 22 further comprising a propel control valve in fluid communication between said hydraulic pump and said at least one hydraulic drive motor, said propel control valve further comprising means for either allowing hydraulic fluid flow from said hydraulic pump to said at least one hydraulic drive motor or for prohibiting such flow.

24. Apparatus of claim 22 in which said hydraulic drive motor comprises at least one hydraulic motor which may provide a rotational output in a forward direction or in a reverse direction.

25. Apparatus of claim 24 in which said propel control valve further comprises means for controlling the direction of rotation of said at least one hydraulic motor.

26. Apparatus of claim 21 in which said drive wheels comprise all of the wheels in said plurality of wheels.

27. Apparatus of claim 21 further comprising:

a. a front drive axle means attached to the front of said truck chassis;

b. said plurality of wheels comprising front drive wheels rotatably attached to and drivable by said front drive axle means;

c. rear drive axle means attached to the rear of said truck chassis, said rear drive axle means being coupled to said transmission and having a power takeoff;

d. means for coupling said power takeoff to said front drive axle; and e. said plurality of wheels comprising rear drive wheels rotatably attached to and drivable by said rear drive axle means.

28. Apparatus of claim 27 in which said rear drive axle means comprises a plurality of drive axles having corresponding drive wheels.

29. A material handling vehicle capable of over-the-road travel to and from a job site comprising:

a. a lower truck chassis supported by a plurality of wheels, at least two of which are drive wheels, said lower truck chassis having a first operator's station;

b. an upper structure mounted on said lower chassis and having a second operator's station;

c. a manipulatable material handling implement mounted on said upper structure;

d. an engine mounted on said lower chassis, said engine being controllable from said first operator's station;

e. a hydraulic power source, said hydraulic power source being controllable from said second operator's station, said hydraulic power source comprising:

(i) a hydraulic drive; and

(ii) an implement controller coupled to said material handling implement; and    f. a manual transmission mounted on said lower chassis, said transmission having a main drive gear coupled to said engine, a selectable output drivedly coupled to said main drive gear and coupled to said hydraulic drive, a secondary input coupled to said hydraulic drive and an output drive coupled to said drive wheels, so that said engine and said main drive gear or said selectable output, said hydraulic drive and said secondary input may drive through the gears of said transmission to drive said output drive and said drive wheels.

30. Apparatus of claim 29 in which said hydraulic drive comprises:

a. a hydraulic pump selectively coupled to said selectable output; and    b. at least one hydraulic drive motor in fluid communication with said hydraulic pump and selectively coupled to said secondary input.

31. Apparatus of claim 30 further comprising a propel control valve in fluid communication between said hydraulic pump and said at least one hydraulic drive motor, said propel control valve further comprising a flow controller adapted to either allow hydraulic fluid flow from said pump to said at least one hydraulic drive motor or for prohibiting such flow.

32. Apparatus of claim 31 in which said at least one hydraulic drive motor may provide a rotational output in a forward direction or in a reverse direction.

33. Apparatus of claim 32 in which said propel control valve further comprises a rotation direction controller for said at least one hydraulic motor.

34. Apparatus of claim 33 in which said propel control valve further comprises a hydraulic controller for allowing hydraulic fluid to pass from said pump directly to said implement controller or to said at least one hydraulic motor and then to said implement controller.

35. Apparatus of claim 30 wherein said secondary input comprises two power inputs each coupled to corresponding countershafts in said transmission that may be coupled to said output drive.

36. Apparatus of claim 30 further comprising a controllable coupling between said secondary input and said output drive including selectable gear ratios.

37. Apparatus of claim 36 further comprising a remote controller for controlling said controllable coupling from said second operator's station.

38. Apparatus of claim 29 further comprising:

a. a horizontally pivotally support for said upper structure on said lower chassis; and    b. a pivot controller to pivot said upper structure relative to said lower chassis.

39. Apparatus of claim 38 in which said material handling implement comprises:

a. a boom movably supported at one end thereof on said upper structure; and    b. a work tool movably supported at the other end of said boom.

40. Apparatus of claim 39 in which said work tool comprises:

a. a bucket; and b. a pivotal support for said bucket on said free end of said boom.

41. Apparatus of claim 37 in which said material handling implement comprises:

a. an extensible boom, said boom having a base boom section and at least one second boom section telescopically received in and supported by said base boom section;

b. boom support for vertically pivotally supporting said base boom section on said upper structure;

c. a pivoter connected intermediate said base boom section and said upper structure for vertically pivoting said base boom section relative to said upper structure;

d. an extender for extending and retracting said second boom section relative to said base boom section;

e. a work tool connected to the free end of said second boom section; and    f. a manipulator for pivoting said tool relative to said second boom section.

42. Apparatus of claim 38 further comprising:

a. a rotatable support for supporting said base boom such that said base boom section is rotatable about its axis; and,    b. tilter for tilting said boom about its axis.

43. Apparatus of claim 42 in which said work tool comprises:

a. a bucket; and b. a pivotal support for said bucket on said free end of said second boom section.

44. Apparatus of claim 29 in which said drive wheels comprise all of the wheels in said plurality of wheels.

45. Apparatus of claim 29 further comprising:

a. a front drive axle attached to the front of said truck chassis;

b. said plurality of wheels comprising front drive wheels rotatably attached to and drivable by said front drive axle;

c. rear drive axle attached to the rear of said truck chassis, said rear drive axle being coupled to said transmission and having a power takeoff;

d. coupling controller to couple said power take off to said front drive axle; and    e. said plurality of wheels comprising rear drive wheels rotatably attached to and drivable by said rear drive axle.

46. Apparatus of claim 45 in which said rear drive axle comprises a plurality of drive axles having corresponding drive wheels.

47. A material handling vehicle comprising:

a. a drivable main chassis having a main drive cab;

b. an upper structure having a material handling device supported thereon and being rotatably attached to said main chassis and having an upper structure operator cab;

c. a hydraulic pump for providing an output of pressurized hydraulic fluid;

d. a hydraulic motor which when activated provides power for driving a secondary drive;

e. controller responsive to an operator in the upper structure operator cab for connecting the hydraulic output of said hydraulic pump to said hydraulic motor; and f. a manual transmission mounted on said main chassis and having a main drive gear effective to provide primary output power to drive said main chassis, or secondary output power to said pump, the gears of said transmission being powered by either said engine and said main drive gear or said secondary drive.

48. Propulsion apparatus for a material handling vehicle capable of over-the-road travel to and from a job site and having a lower truck chassis supported by a plurality of wheels, at least two of which are drive wheels, said lower truck chassis having a first operator's station, an upper structure mounted on said lower chassis and having a, second operator's station, a manipulatable material handling implement mounted on said upper structure and an engine mounted on said lower chassis, said engine being controllable from said first operator's station, said propulsion apparatus comprising;

a. a hydraulic power source, said hydraulic power source being controllable from said second operator's station, said hydraulic power source comprising:
  (i) a hydraulic drive; and
  (ii) an implement controller coupled to said material handling implement for manipulating said material handling implement; and b. a manual transmission adapted to be mounted on said lower chassis, said transmission having a main drive gear coupleable to said engine, a selectable output drivedly coupled to said main drive gear and coupleable to said hydraulic drive, a secondary input coupled to said hydraulic drive and an output drive coupled to said drive wheels, so that said engine and said main drive gear or said selectable output, said hydraulic drive and said secondary input may drive through the gears of said transmission to drive said output drive and said drive wheels.

49. Apparatus of claim 48 in which said hydraulic drive comprises:

a. a hydraulic pump selectively coupled to selectable output; and b. at least one hydraulic drive motor in fluid communication with said hydraulic pump and selectively coupled to said secondary input.

50. Apparatus of claim 49 further comprising a propel control valve in fluid communication between said hydraulic pump and said at least one hydraulic drive motor, said propel control valve further comprising a hydraulic controller for either allowing hydraulic fluid flow from said hydraulic pump to said at least one hydraulic drive motor or for prohibiting such flow.

51. Apparatus of claim 50 in which said hydraulic drive motor comprises at least one hydraulic motor which may provide a rotational output in a forward direction or in a reverse direction.

52. Apparatus of claim 51 in which said propel control valve further comprises a rotation direction controller for at least one hydraulic motor.

53. Apparatus of claim 52 in which said drive wheels comprise all of the wheels in said plurality of wheels.

54. Apparatus of claim 53 further comprising:

a. a front drive axle attached to the front of said truck chassis;

b. said plurality of wheels comprising front drive wheels rotatably attached to and drivable by said front drive axle;

c. rear drive axle attached to the rear of said truck chassis, said rear drive axle being coupled to said transmission and having a power takeoff;

d. coupling controller to couple said power takeoff to said front drive axle; and e. said plurality of wheels comprising rear drive wheels rotatably attached to and drivable by said rear drive axle.

55. Apparatus of claim 54 in which said rear drive axle comprises a plurality of drive axles having corresponding drive wheels.

* * * * *